UNITED STATES PATENT OFFICE.

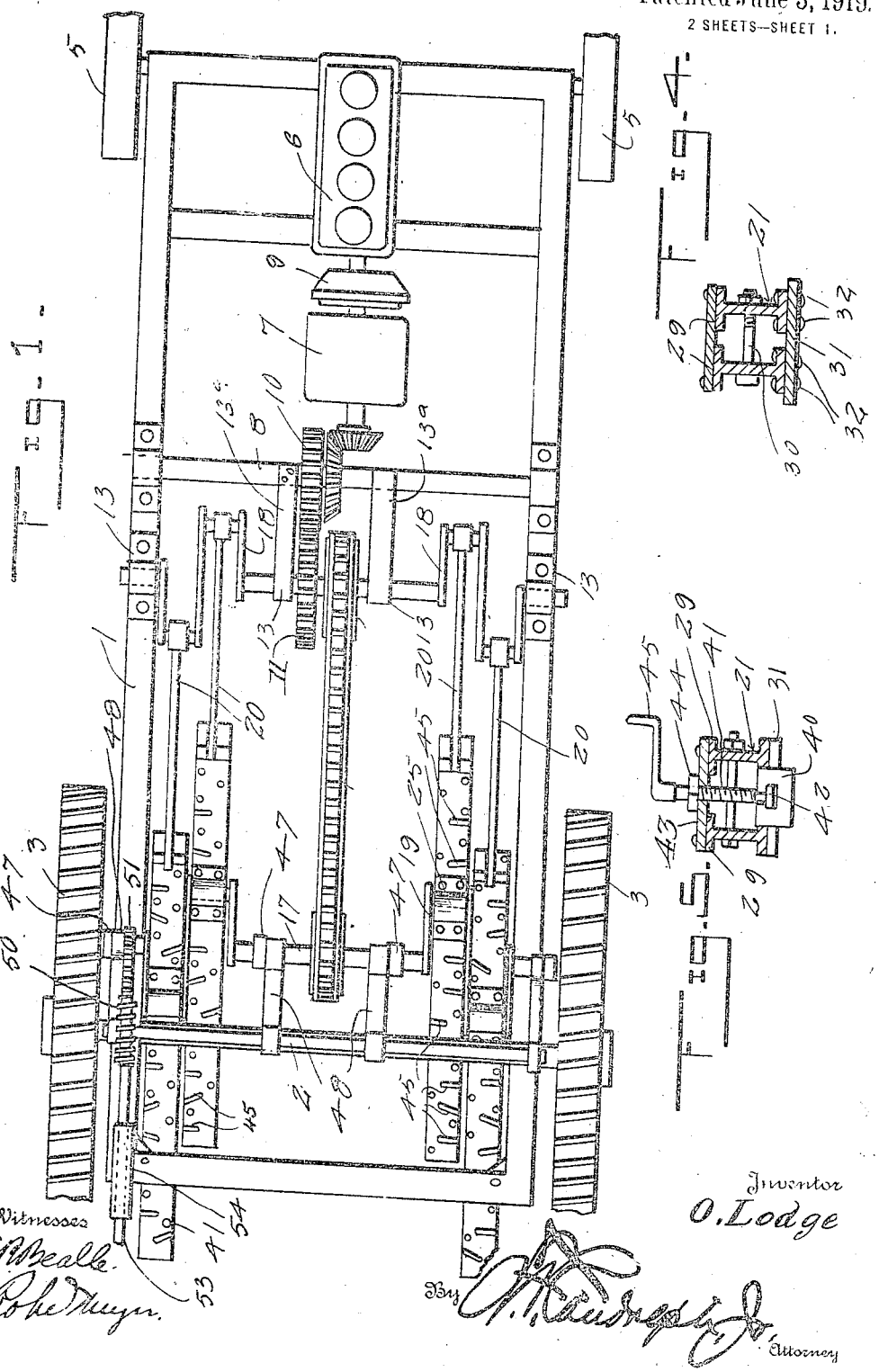

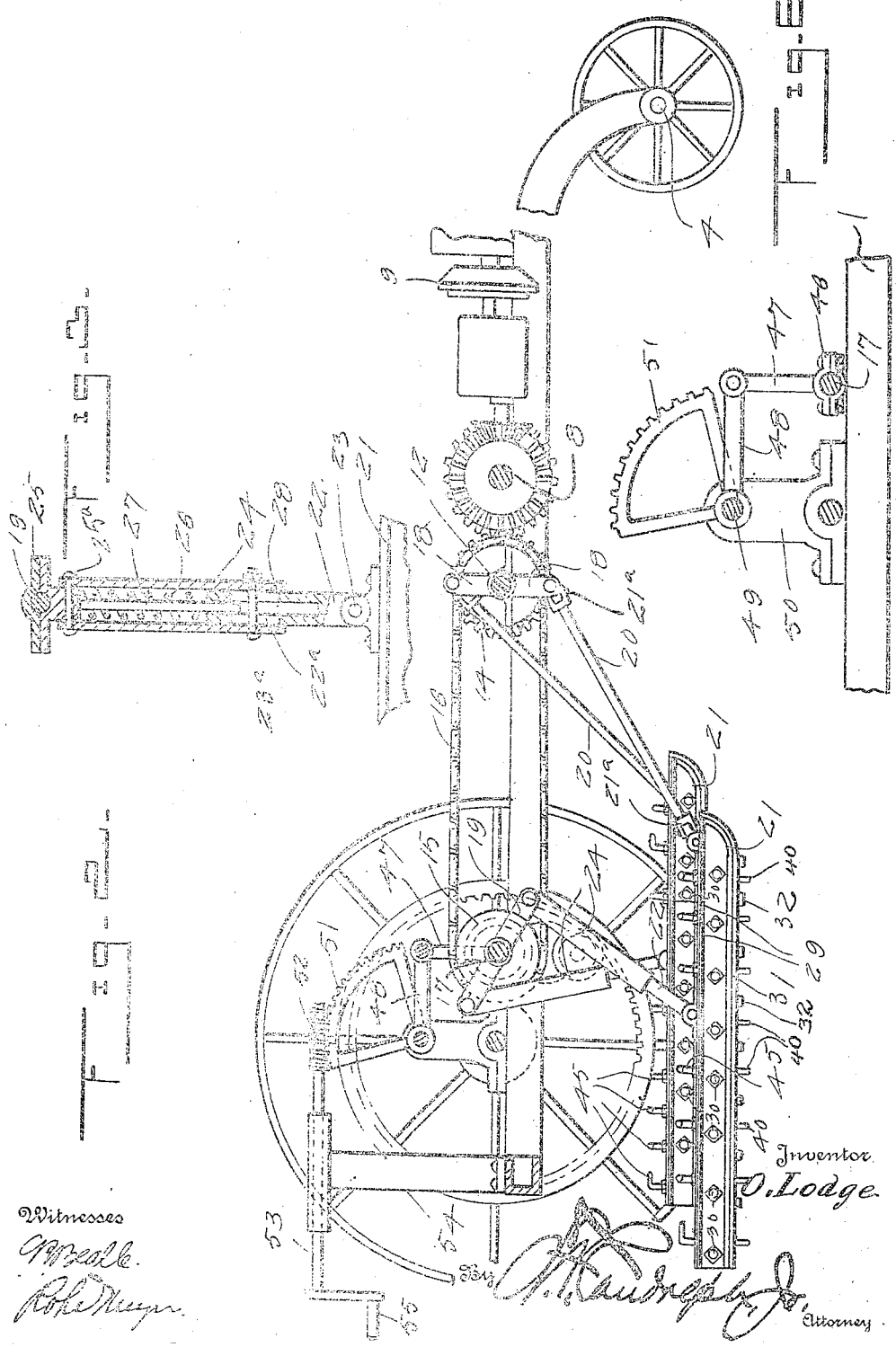

OSCAR LODGE, OF NEW BRIGHTON, PENNSYLVANIA.

TRACTOR.

1,305,385.

Specification of Letters Patent.  Patented June 3, 1919.

Application filed May 8, 1918. Serial No. 233,291.

*To all whom it may concern:*

Be it known that I, OSCAR LODGE, a citizen of United States, residing at New Brighton, in the county of Beaver and State of Pennsylvania, have invented certain new and useful Improvements in Tractors; and I do hereby declare the following to be a full, clear, and exact description of the invention, such as will enable others skilled in the art to which it appertains to make and use the same.

This invention relates to tractors, and the primary object of the invention is to provide a novel propelling structure for a tractor including a plurality of traction shoes which are connected to crank shafts, that are driven from the engine or prime mover of the tractor, for moving the traction shoes into engagement with the ground and forcing the tractor forwardly which tractor shoes embody the advantages of a caterpillar tread without requiring the same amount of power.

A further object of this invention is to provide a yieldable connection between the traction shoes and the rear crank shaft to allow the shoes to move upon engagement with undulations in the surface over which the tractor is traveling.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:

Figure 1 is a plan of the improved attachment, showing it applied to a part of a tractor, Fig. 2 is a section through a tractor, illustrating the improved tractor device applied thereto, Fig. 3 is a vertical section through the resilient connection between the traction shoes and the rear crank shaft, Fig. 4 is a section through one of the traction shoes, and Fig. 5 is a section through one of the traction shoes, showing the adjustable cleat.

Fig. 6 is a detail sectional view of the means for raising and lowering the rear crank shaft.

Referring more particularly to the drawings, 1 designates the supporting frame of the tractor as an entirety, which may be of any ordinary type. The supporting frame 1 has a rear axle 2 carried thereby upon which are mounted the usual type of supporting wheels 3. It also has a front axle 4 carried thereby, upon which are mounted supporting wheels 5. It is to be understood that any of the ordinary constructions of tractors may be employed, without departing from the spirit of this invention.

A prime mover 6 is employed for operating the tractor, and this prime mover is connected through a gear transmission structure 7 with a shaft 8 which extends transversely across the frame or chassis 1 of the tractor. The usual type of clutch mechanism indicated generically at 9 may be employed for controlling the rotation of the shaft 8.

The shaft 8 has a gear 10 mounted thereupon which meshes with a gear 11 mounted upon a crank shaft 12. The crank shaft 12 is supported by suitable bearings 13 carried by the side rails and members 13ª of the supporting frame 1 of the tractor, and it is connected through the medium of a pair of sprockets 14 and 15, and a sprocket chain 16 with a second or rear crank shaft 17. The cranks 18 of the front crank shaft 12 are positioned directly in alinement with the cranks 19 of the rear crank shaft 17 and the corresponding cranks upon each shaft extend in the same direction, as clearly shown in Fig. 1 of the drawings. A pair of opposed cranks is formed upon each of the crank shafts. The cranks 18 of the front crank shaft 12 have connecting rods 20 connected thereto, which connecting rods are pivotally connected to the front ends of the traction shoes 21. The connected rods are provided with pivots 21ª at each end to permit a side motion of the shoes during the operation of the device.

The traction shoes 21 have rods 22 pivotally connected thereto, as shown at 23, between their ends. The rods 22 extend slidably in sleeves 24, which sleeves are connected to the cranks 19 of the rear crank shaft 17 by suitable coupling structures, indicated at 25. The sleeves 24 are provided with pivots 25ª, which coöperate with the pivots 21ª in permitting the side motion of the shoes. Coil springs 26 are mounted within the sleeves 24 and engage the upper ends of the rods 22 for yieldably forcing the traction shoes 21 downwardly. Rods 27 extend downwardly centrally within the sleeves 24 and they are slidably mounted in bores or recesses 28 formed in the rods 22, as clearly shown in Fig. 3 of the drawings. The rods 22 are provided with slots 22ª that receive bolts 23ª to prevent the sleeves and rods from separating when the shoes are lifted from engagement with the ground.

Each of the traction shoes 21 is formed of a pair of I beams 29, which are braced and connected by suitable bolts 30. The I beams 29 have plates 31 attached to their under surfaces, a plurality of cleats 32 being formed upon the under or ground-engaging surfaces of the plates 31, for biting into the ground, to prevent slipping of the shoes during the operating thereof.

The rotation of the crank shafts 12 and 17 will impart a movement to the shoes 21, and move the shoes first downwardly into engagement with the ground, and any further movement of the crank shaft will force the vehicle or tractor forwardly, for a portion of the movement of the crank shaft, after which the shoes will be raised upwardly and moved forwardly for again being moved downwardly into engagement with the surface over which the tractor is traveling for propelling the same. The cranks 18 and 19 of the crank shafts 12 and 17 being disposed in opposite pairs will cause a pair of the traction shoes 21 to always be in a pushing position or in engagement with the ground. The provision of the shoes, and the manner of operating them, will permit the tractor to pass over relatively high obstacles, without any apparent effort.

In Fig. 5 of the drawings, an adjustable cleat is illustrated, which cleat is designed for use when the tractor is traveling over mud or slippery places. The improved adjustable cleat comprises the cleat proper indicated by the numeral 40, which has a vertical feed screw 41 swivelly connected thereto, as shown at 42. The feed screw 41 extends upwardly through a plate 43, which is attached in any suitable manner to the I beams 29. A nut 44 is mounted upon the feed screw and engages the upper surface of the plate 43. A crank handle 45 is mounted upon the upper end of the feed screw for rotating the same and when the feed screw is rotated, the cleat body 40 may be raised or lowered out of an operative position or into an operative position when necessary.

The rear crank shaft is journaled in bearings 46 carried by links 47 that are pivoted to the ends of arms 48. The arms 48 are secured to an elevating shaft 49 journaled in standards 50 secured to the frame 1. The shaft 49 has a segmental rack 51 secured thereto, the teeth of which mesh with a worm 52 carried by an operating shaft 53 journaled in a standard 54 carried by the frame 1. The operating shaft 53 is provided with a handle 55 for rotating the same to elevate and lower the shaft 17, which moves the shoes out of and into engagement with the ground, as desired.

From the foregoing description, taken in connection with the accompanying drawings, the advantages of construction and the method of operation of the improved tractor will be readily apparent to those skilled in the art to which this invention appertains, and, while in the foregoing description, the principle of the operation of this invention has been described together with various features of construction, it is to be understood that certain minor features of construction, combination and arrangement of parts may be altered to suit practical conditions, provided such alterations are comprehended within the scope of what is claimed.

What is claimed is:

1. In a tractor, a plurality of traction shoes, a forward and a rear crank shaft, connecting rods connecting the crank portions of the forward crank shaft to said traction shoes near their forward ends, and yieldable connecting rods connecting the crank portions of said rear crank shaft and said traction shoes between their ends.

2. In a tractor, a forward crank shaft, a rearward crank shaft, means for simultaneously rotating said crank shafts, a plurality of traction shoes, cleats carried by the ground engaging surfaces of said traction shoes, connecting rods connected to the cranks of the front crank shaft and to said traction shoes near their forward ends, yieldable means connecting the cranks of the rear crank shaft to said traction shoes between the ends of the shoes, the crank of said crank shaft being arranged whereby one of said shoes will be moved upwardly, forwardly and downwardly while another of the shoes is in a ground engaging position and further arranged to apply a pushing force to the traction shoes when in a ground engaging position to propel the tractor.

3. In a tractor, a forward crank shaft, a rear crank shaft, means for rotating said crank shafts, a plurality of traction shoes arranged in pairs, cranks formed upon said forward and rear crank shafts arranged in corresponding pairs, one crank of each pair of the cranks extending oppositely to the other crank of the pair, connecting rods connecting the cranks of the front shaft to said traction shoes near their forward ends, connecting rods connecting the cranks of the rear crank shaft to said traction shoes between their ends, said last named connecting rods composed of sleeves, rods pivotally connected to the traction shoes and telescopically seated in said sleeves, and a spring mounted within said sleeves and engaging the ends of said last named rod for yieldably connecting the traction shoes to the rear crank shaft.

4. In a tractor, a plurality of traction shoes, crank shafts, means rotating said crank shafts, means connecting said crank shafts and said shoes for moving the shoes upwardly, forwardly, and downwardly and applying a pushing force to the shoes when in a downward position, and means elevating one of the crank shafts to render the shoes inoperative.

In testimony whereof I affix my signature in presence of two witnesses.

OSCAR LODGE.

Witnesses:
M. CUTHBERTSON,
MARY A. WISE.